United States Patent [19]

Walker

[11] Patent Number: 5,054,405
[45] Date of Patent: Oct. 8, 1991

[54] HIGH TEMPERATURE TURBULENT GASIFICATION UNIT AND METHOD

[75] Inventor: David R. Walker, Clearwater, Fla.

[73] Assignee: Serawaste Systems Corporation, Tampa, Fla.

[21] Appl. No.: 607,118

[22] Filed: Nov. 2, 1990

[51] Int. Cl.⁵ .......................... F23G 5/00; F23G 5/12
[52] U.S. Cl. ................... 110/254; 110/165 R; 110/165 A; 110/235; 110/259; 110/302; 110/346; 431/167
[58] Field of Search ........... 110/235, 254, 259, 165 R, 110/165 A, 255, 302, 346, 247, 264, 227; 431/165, 167

[56] References Cited

U.S. PATENT DOCUMENTS

| | | | |
|---|---|---|---|
| 2,936,724 | 5/1960 | Bishop | 110/18 |
| 3,195,608 | 7/1965 | Voorheis et al. | 158/5 |
| 3,605,656 | 9/1971 | Stribling | 110/13 |
| 3,785,304 | 1/1974 | Stookey | 110/8 R |
| 4,213,404 | 7/1980 | Spaulding | 110/229 |
| 4,498,909 | 2/1985 | Milner et al. | 48/209 |
| 4,574,711 | 3/1986 | Christian | 110/264 |
| 4,651,654 | 3/1987 | Erlandsson et al. | 110/254 |
| 4,712,491 | 12/1987 | Schmidt | 110/346 |
| 4,936,231 | 6/1990 | Johnson | 110/235 |
| 4,940,006 | 7/1990 | Temelli | 110/243 |

Primary Examiner—Edward G. Favors
Attorney, Agent, or Firm—Foley & Lardner

[57] ABSTRACT

Waste materials are efficiently and completely incinerated in a gasification unit with a minimum amount of fly ash while ensuring complete sterilization of residual materials. The gasification unit includes a refractory liner which is stepped to define primary, secondary, and tertiary combustion chambers where waste materials are completely incinerated. A fan is adapted to draw combustion air past the outer surface of the refractory liner to initially heat the combustion air while simultaneously cooling the refractory liner. The fan is further adapted to force combustion air under pressure into a preheating chamber in which the combustion air is preheated before passing into the primary and secondary combustion chambers. Turbulence in the combustion chambers, brought about through equalization of air pressure in the preheating chamber, is effected through the provision of tangential air inlets in the walls of the refractory liner. A sloped floor of the refractory liner cooperates with an ash removal device and a secondary burner to ensure complete combustion of the waste materials and sterilization of residual ashes within the gasification unit.

30 Claims, 4 Drawing Sheets

5,054,405

HIGH TEMPERATURE TURBULENT GASIFICATION UNIT AND METHOD

BACKGROUND OF THE INVENTION

The present invention relates to a system and method for incinerating waste materials. In particular, the invention relates to a system for incinerating waste materials at high temperatures and under high turbulence, thereby to increase the efficiency of the combustion process and to decrease fly ash emissions.

Environmental concerns have motivated a search for waste incineration systems capable of efficiently incinerating waste materials while decreasing emissions of pollutants. The need for such systems is especially critical in the disposal of high-moisture wastes such as wood pulp or sewage and in the disposal of hospital wastes which are often contaminated or infectious. Traditional incinerating systems which simply burn waste materials in a combustion chamber under relatively low turbulence and at relatively low temperatures tend to emit unacceptably high amounts of fly ash and other pollutants to the atmosphere. Such systems are particularly ill-suited for the incineration of contaminated or infectious waste materials or of materials having relatively high amounts of moisture. If these waste materials are to be incinerated, care must be taken to incinerate completely the waste, to minimize the emission of fly ash, and to dispose of the toxic residual ashes remaining from the combustion process. While several systems have been designed to maximize combustion by dividing the combustion chamber into at least two separate combustion chambers separated by a step in the refractory liner defining the chambers, these systems still tend to operate at unacceptably low temperatures and to emit excessive amounts of fly ash.

Although some attempts have been made to reduce the emissions of toxic pollutants, these systems have proved incapable of economically handling infectious or contaminated waste materials or materials having a high water content. For example, U.S. Pat. No. 4,940,006, which issued to S. Tamelli on July 10, 1990, discloses an incineration system which includes a combustion chamber which is throttled or stepped to define a combustion zone below the throttle point and an afterburning zone above the throttle point. Waste materials are introduced into the combustion zone from the side of the unit, and primary combustion air is introduced into the combustion chamber from below. Nozzles inject additional or secondary air at a high velocity into the unit at a location above the combustion zone. This secondary air forms a grid which prevents flue gasses from exiting the combustion zone without being intensely mixed with the secondary air. As a result, the flue gasses are retained in the combustion zone for a relatively long time where they are intensely mixed with the combustion air at relatively high temperatures. This results in improved incineration of waste materials, which in turn reduces fly ash emissions.

This system, while more efficient than previously known systems, is ill-suited for economically incinerating contaminated or infectious materials or materials having a high water content. Since primary and secondary air is cold-blown into the unit, considerable energy must be consumed to raise the temperatures of the burning materials to the preferred temperatures of 900°–1050° C., thus increasing the operating costs and reducing the efficiency of the system. Moreover, turbulence in parts of the combustion zone is reduced due to the manner in which the primary combustion air is drawn into the bottom of the unit. Although tertiary nozzles can be added to the combustion zone to reduce this problem, these nozzles increase the construction and operating costs of the system. In addition, this system lacks any device for ensuring the sterilization of residual ashes before their removal.

SUMMARY OF THE INVENTION

It is therefore an object of the present invention to provide a system which can economically and efficiently incinerate contaminated or infectious materials or materials having a high moisture content while simultaneously sterilizing residual ash materials.

In accordance with a first aspect of the invention, the unit includes a refractory liner surrounding a primary combustion chamber, means for drawing combustion air past a portion of the refractory liner in contact with an outer surface thereof such that the combustion air is preheated and the refractory liner is cooled, and means for injecting the combustion air into the primary combustion chamber via primary air inlets formed in the refractory liner. The unit also includes means for injecting waste materials into the combustion chamber via a material inlet formed in the refractory liner, and means for sterilizing and then removing residual ashes from the gasification unit.

In accordance with another aspect of the invention, a lower portion of the refractory liner is enclosed in a cooling chamber having an inlet and having an outlet connected to the inlet of the fan. In addition, baffles are located within the cooling chamber and are adapted to force incoming combustion air to circulate around the refractory liner before exiting the cooling chamber via the outlet. A shutter device connects the inlet of the cooling chamber to the ambient atmosphere.

In accordance with another aspect of the invention, a wall surrounds at least an upper portion of the refractory liner with a space formed therebetween to define an enclosed preheating chamber. The outlet of the fan is connected to the preheating chamber via a first conduit at a location above the primary air inlets, and the primary air inlets extend tangentially through a side wall of the refractory liner and into the primary combustion chamber. The refractory liner is stepped at a first location to define a secondary combustion chamber which is located above the primary combustion chamber and which has a diameter which is smaller than that of the primary combustion chamber, and secondary air inlets extend tangentially through the side wall of the refractory liner and into the secondary combustion chamber. In addition, the refractory liner is stepped at a second location to define a tertiary combustion chamber which is located above the secondary combustion chamber and which has a diameter which is smaller than that of the secondary combustion chamber, and tertiary air inlets extend tangentially through the side wall of the refractory liner and into the tertiary combustion chamber from a tertiary air inlet chamber which is connected to the outlet of the fan via a second conduit.

In accordance with yet another aspect of the invention, a fly ash removal device is connected to an outlet of the secondary combustion chamber.

In accordance with still another aspect of the invention, the means for sterilizing and removing ashes includes a floor of the primary combustion chamber which slopes downwardly, and an ash removal device comprising a plurality of spiral blades which are adapted to transport residual ashes from the sloped floor to a central portion of the primary combustion chamber at a predetermined speed. A second stage burner is located beneath the ash removal device and is adapted to heat further the residual ashes, thereby to ensure complete combustion of the waste materials and sterilization of the residual ashes. In addition, means are provided for conveying the residual ashes out of the gasification unit.

Another object of the invention is to provide a method of gassifying waste materials.

In accordance with one aspect of the invention, the method comprises the steps of providing a gasification unit including a refractory liner which surrounds a primary combustion chamber, drawing combustion air past a portion of the refractory liner in contact with an outer surface thereof, thereby to preheat the combustion air while simultaneously cooling the refractory liner, and then injecting the combustion air into the primary combustion chamber. Other steps include injecting waste materials into the combustion chamber, discharging exhaust gases from the gasification unit, and sterilizing and then removing residual ashes from the gasification unit.

In accordance with another aspect of the invention, the refractory liner has a lower portion thereof enclosed in a cooling chamber having an inlet and an outlet. The step of preheating the combustion air while cooling the refractory liner includes the steps of drawing the combustion air into the inlet of the cooling chamber, then forcing the combustion air to circulate around the refractory liner, and then drawing the combustion air out through the outlet of the cooling chamber. A further step includes adjusting a rate at which the combustion air is drawn into the inlet of the cooling chamber by adjusting an opening degree of a shutter device which connects the inlet of the cooling chamber to the atmosphere.

In accordance with still another aspect of the invention, further steps include injecting the combustion air into an enclosed preheating chamber at a location above the primary air inlets which connect the preheating chamber to the primary combustion chamber, the enclosed preheating chamber being defined by a space formed between the refractory liner and a shell surrounding at least an upper portion of the refractory liner, then equalizing a pressure of the combustion air within the preheating chamber, and then injecting the combustion air through primary air inlets which extend tangentially through a side wall of the refractory liner wall and into the primary combustion chamber, thereby to increase turbulence within the primary combustion chamber.

In accordance with yet another aspect of the invention, further steps include removing fly ash from the gasification unit before releasing exhaust gases into the atmosphere, then storing the fly ash in a separation tank, and then removing the fly ash from the separation tank at a controlled rate.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Pursuant to the present invention, waste materials are efficiently and completely incinerated with a minimum amount of fly ash while ensuring complete sterilization of residual materials. The gasification unit includes a refractory liner which is stepped to define primary, secondary, and tertiary combustion chambers where waste materials are completely incinerated. A fan is adapted to draw combustion air past the outer surface of the refractory liner to heat initially the combustion air while simultaneously cooling the refractory liner, enabling the use of a relatively thin-walled refractory liner in the combustion unit. The fan is further adapted to force combustion air under pressure into a preheating chamber in which the combustion air is heated further before passing into the primary and secondary combustion chambers. Turbulence in the combustion chambers, brought about through equalization of air pressures in the preheating chamber, is effected through the provision of tangential air inlets extending through the walls of the refractory liner in a direction opposite to the flow of combustion air in the pre-heating chamber. A fly ash removal device further decreases the emission of fly ash from the unit. A sloped floor of the refractory liner cooperates with an ash removal device and a second stage burner to promote complete combustion of the waste materials and to ensure sterilization of residual ashes within the gasification unit. A detailed description of the preferred embodiments of the gasification unit follows.

Figure 1:
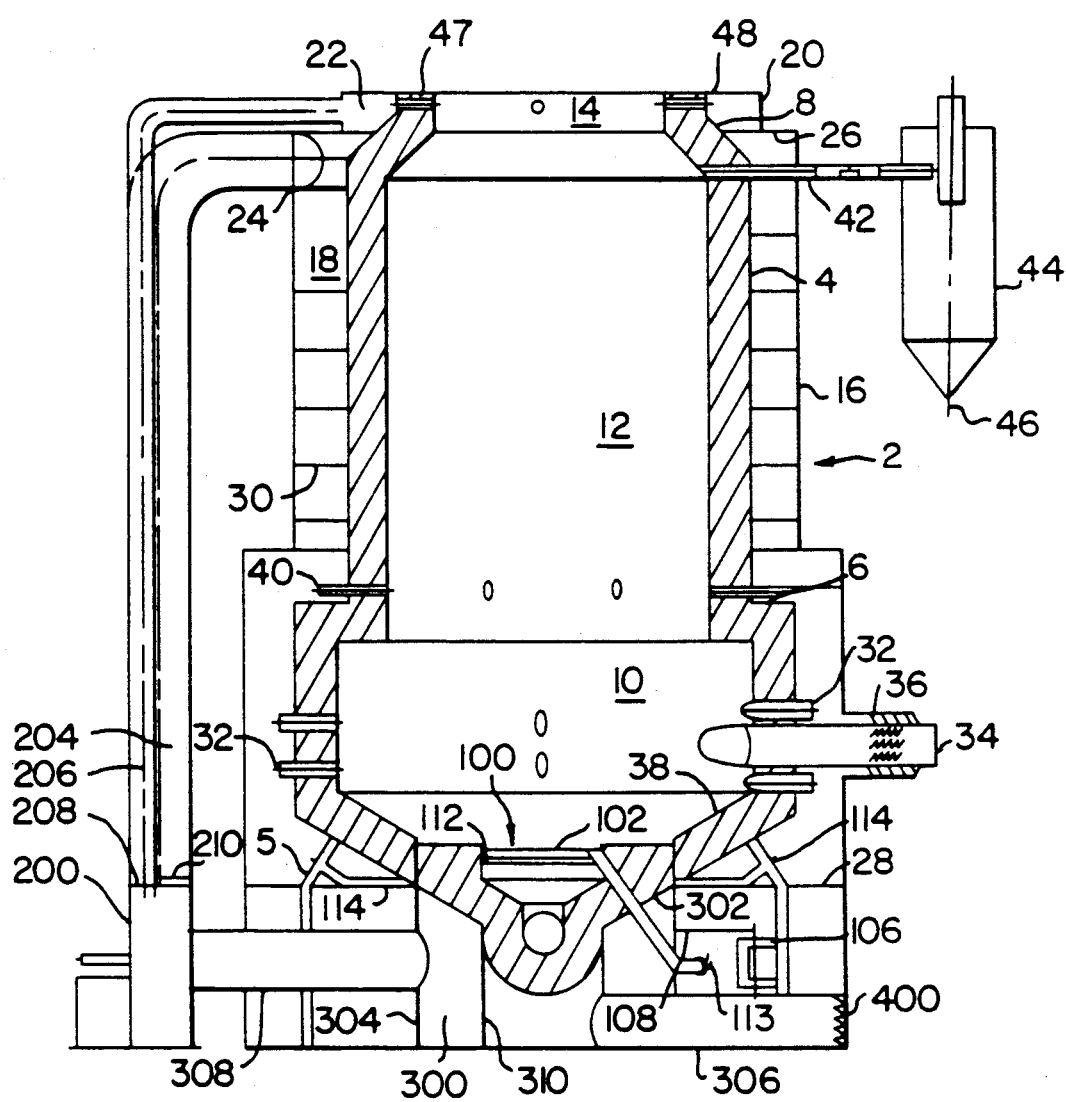
FIG. 1 is a schematic representation, shown partially in cross section, of a side view of a gasification unit constructed in accordance with a first embodiment of the present invention.
Figure 2:
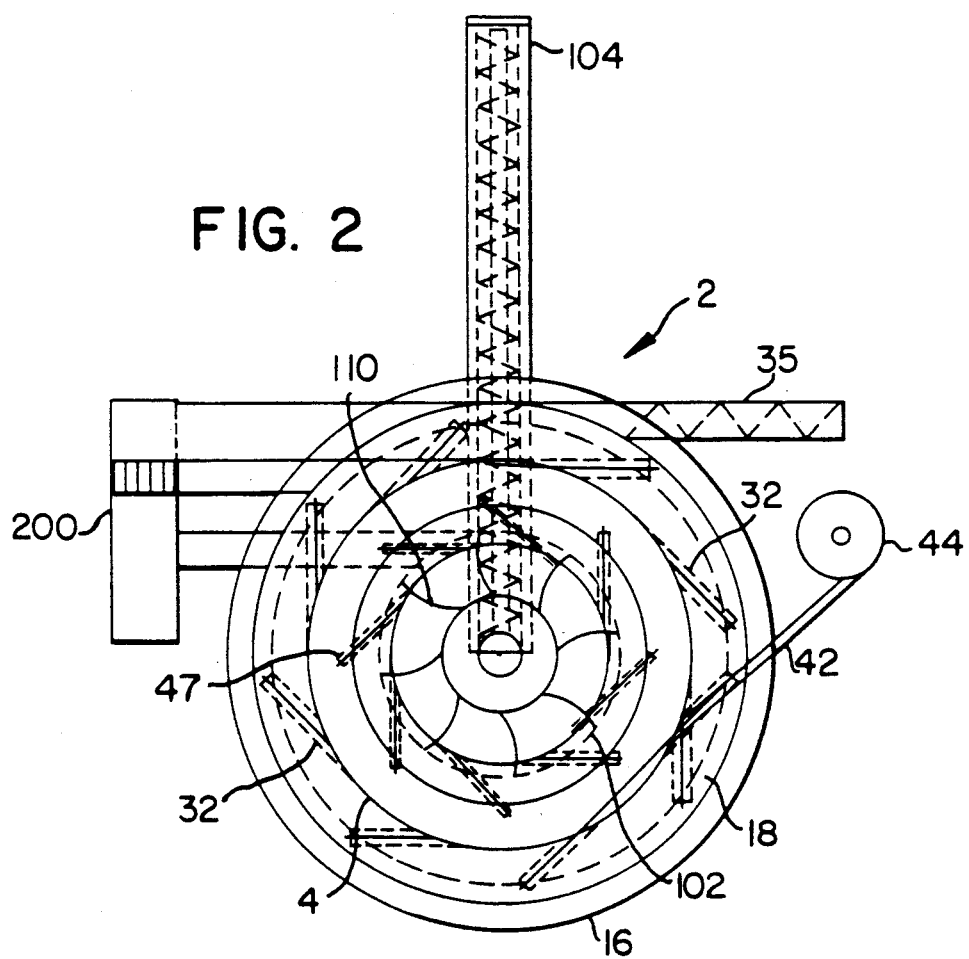
FIG. 2 is a schematic representation of a top view of the gasification unit illustrated in FIG. 1.

With reference to FIGS. 1 and 2, a furnace 2 includes a generally cylindrical refractory liner 4. The refractory liner 4 is mounted on supports 5 and includes a first step 6 which defines a boundary between a primary combustion chamber 10 and a secondary combustion chamber 12. Refractory liner 4 further includes a second step 8 which defines a boundary between the secondary combustion chamber 12 and a tertiary combustion chamber 14. A first generally cylindrical shell 16 surrounds a portion of refractory liner 4 to define a preheating chamber 18 for primary and secondary combustion air. and a second shell 20 defines an inlet chamber 22 for tertiary combustion air. An apparatus 100 is positioned in the bottom of refractory 4 for sterilizing and removing residual ashes from the bottom of a primary combustion chamber 10. A fan 200 has an inlet connected to a cooling chamber 300 and an outlet connected to preheating chamber 18 and to a tertiary air inlet chamber 22.

Cooling chamber 300 surrounds a lower portion 302 of the refractory liner 4 and has a generally cylindrical outer wall 304 separating the chamber from the ambient atmosphere. Cooling chamber 300 includes an inlet which cooperates with the ambient atmosphere via an inlet conduit 306 and an outlet which is connected to an inlet of fan assembly 200 via an outlet conduit 308. The inlet and outlet conduits 306 and 308 are vertically offset from one another to increase the turbulence of air within the chamber 300. Vertical baffles 310 extend part-way across chamber 300 on opposite sides of the chamber to force air flowing through the chamber to circulate around refractory liner portion 302.

A manually operated shutter device 400 controls the airflow rate into the inlet conduit 306 and generates a spiral airflow within the conduit that increases turbulence within the cooling chamber 300 to increase the heat transfer efficiency within the cooling chamber. This device, illustrated in greater detail in FIG. 3, comprises a pair of circular plates 402 mounted in the inlet conduit. These plates are superimposed one in front of the other so that only one of these plates can be seen when the device is in the fully open position illustrated in FIG. 3. Each of these plates comprises a plurality of generally spiral-shaped vanes 404 mounted on a central shaft 406. The outer plate is fixed on the shaft, and the inner plate is adapted to rotate about the shaft, and is driven manually via a handle (not shown).

Figure 3:
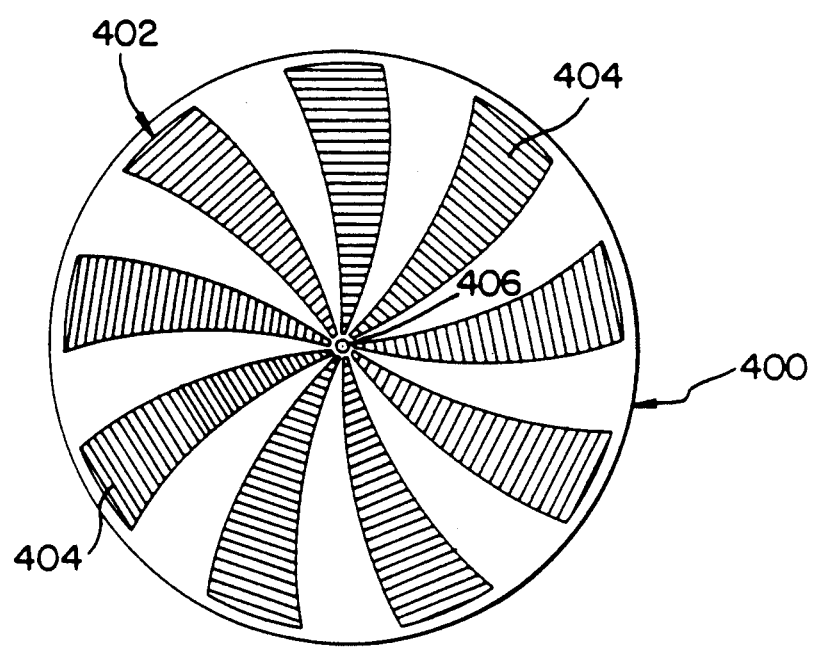
FIG. 3 is a front view of a shutter device used in the gasification unit of FIG. 1.

When the inner plate 402 is rotated to the position illustrated in FIG. 3 so that the vanes 404 of the respective plates 402 are superimposed one in front of the other, air may be drawn into the inlet conduit between the spaces formed between the vanes 404. The curved surfaces of these vanes cause air flowing through the device to rotate in a generally spiral pattern. The airflow rate through the device can be decreased simply by rotating the inner plate so that the vanes of the respective plates are no longer superimposed, thereby reducing the effective spacings between the vanes. When the inner plate is rotated so that its vanes completely block the openings formed between the vanes of the outer plate, airflow through the shutter is essentially blocked.

After entering the inlet conduit 306 through the shutter device 400, combustion air is drawn through cooling chamber 300 where it circulates around refractory liner portion 302 in contact therewith before exiting the cooling chamber. The flow of air past the refractory liner heats the combustion air, for example, to a temperature of about 200°-250° F. and cools the refractory liner. This cooling effect allows the provision of a refractory liner which is considerably thinner than conventional liners, thereby lowering the cost and size of the unit.

After exiting the cooling chamber 300 via conduit 308, the combustion air is drawn through fan 200 and is then forced through first and second conduits 204 and 206 and into preheating chamber 18 and tertiary air inlet chamber 20. Shutter devices 208 and 210 control the flow rate of combustion air through conduits 204 and 206. These shutter devices are identical in construction to shutter device 400 but are operated automatically in a manner which is known per se. The control devices for these shutters typically comprise a control system which monitors temperatures and combustion efficiencies within the primary, secondary, and tertiary combustion chambers and which actuate pneumatically-controlled valves to vary the opening degrees of the shutters. The combustion efficiencies may be sensed, e.g., by monitoring at least one of the oxygen, carbon, and hydrocarbon levels within the combustion chambers.

From conduit 204, combustion air flows through an inlet 24 extending tangentially into preheating chamber 18 and thence into the preheating chamber in a generally spiral pattern. The generally cylindrical preheating chamber is bordered on the top and bottom by walls 26 and 28 and at the outside by shell 16. The fan 200 is oversized so as to supply air into chamber 18 at a sufficiently high pressure to force the air down into chamber 18, thereby to pressurize the preheating chamber.

While flowing towards the primary and secondary combustion air ports, the combustion air present within the preheating chamber 18 is preheated to a temperature of 250°-350° F. via contact with the outer surface of refractory liner 4, with the amount of preheating depending on the length of time for which the air remains in the preheating chamber. By preheating the combustion air in this manner, the combustion efficiency of the unit is greatly enhanced without requiring the provision of separately fueled burners to preheat the air.

In order to increase the retention time of air in the preheating chamber and hence the temperature of the combustion air at the inlet ports for the combustion chambers, baffles 30 are provided in the preheating chamber 18. Although they are not absolutely essential, these baffles prevent combustion air from "short circuiting" by travelling vertically from the inlet 24 to inlet ports for the combustion chambers 10 and 12. The number and placement of these baffles can be varied to meet the combustion requirements of the particular material being incinerated.

Combustion air flowing into the portion of preheating chamber 18 surrounding primary combustion chamber 10 enters the primary combustion chamber via inlet ports 32 extending through the side wall of the refractory liner 4. As illustrated in FIG. 2, these ports extend tangentially through the side wall of the refractory liner 4 and into the primary combustion chamber in a direction which is opposite to the direction of the substantially spiral flow of combustion air. By orientating the inlets in this manner, the unit ensures that the direction of the airflow must be reversed before it enters the combustion chamber. This reversal of airflow not only increases the pressure of air flowing into the combustion chamber, but also ensures that the pressure will be equalized at all inlet ports. This results in increased turbulence within the primary combustion chamber, which in turn results in increased combustion efficiency. The tangential introduction of combustion air into the primary combustion chamber further increases the turbulence in the chamber. As illustrated in FIGS. 1 and 2, the pipes or other members forming inlet ports 32 actually extend into the preheating chamber 18 by a sufficient amount to prevent the formation of eddy currents within the preheating chamber, which eddy currents tend to decrease the flow rate of combustion air into the combustion chamber. These ports are designed to supply the amount of oxygen required for maximum combustion efficiency within the primary combustion chamber. Although they are illustrated as being positioned literally tangential to the wall of the refractory liner, these inlet ports may be angled by as much as 8 degrees from the wall of the refractory liner without substantially affecting the operation of the ports.

Waste materials are injected into primary combustion chamber 10 via waste material inlet 34 located between rows of combustion air inlets 32. This inlet, like the combustion air inlet ports, extends tangentially through the side wall of the refractory liner to increase turbulence within the chamber. In addition, the waste materials are injected at relatively high speeds via a high-speed conveyor 35, a fan, or some other suitable conveying device. This high speed tangential injection breaks up larger clumps of materials and promotes maximum mixing of the materials with the combustion air, thereby increasing combustion efficiency within the primary combustion chamber. In a preferred embodiment, the injection device is provided with air inlets 36 which cooperate with the preheating chamber 18. These inlets draw preheated combustion air into the waste material to heat the material within the injection device to a temperature of at least 212° F. This heating increases combustion efficiency by allowing moisture within the materials to boil away immediately upon the injection of materials into the primary combustion chamber.

A sloped portion 38 of the refractory liner 4 defines a portion of the floor of the primary combustion chamber 10. The angle of the slope is set to increase the air turbulence adjacent the slope and to maximize the retention time of the waste materials within the combustion chamber in contact with the combustion air. The angle of this slope is dictated by the density and particle size of the material being incinerated and the ash content of the material.

For example, sludge can have an ash level which is as low as 7% and as high as 48% by volume. In the former case, the relatively small volume of ash will have a smaller tendency to accumulate on the slope, so the slope need only be set at 45°–50°. However, in the latter case, there is a high tendency for ashes to accumulate on the slope, requiring that the portion be sloped at an angle of 65°–70°. The slope would similarly be increased or decreased in dependence on the density of ash, with denser ashes having a greater tendency to accumulate, thereby requiring a greater slope.

As discussed above, the refractory liner 4 includes a step 6, located at the top of the primary combustion chamber 10, which defines the bottom of the secondary combustion chamber 12. This step increases the radial airflow around the top of the primary combustion chamber to increase further the turbulence within the primary combustion chamber and to form a barrier at the top of the chamber which suppresses the emission of materials from the primary combustion chamber.

The suppression effect of the step 6 is supplemented by the injection of secondary combustion air into the secondary combustion chamber via inlet ports 40. These ports, like primary combustion air inlet ports 32, extend tangentially through the side wall of refractory liner 4 to ensure a radial flow of pressurized air in the secondary chamber. This radial flow of air accelerates the flow of materials within the chamber, thereby further to suppress material flow out of the primary combustion chamber 10. The secondary inlet ports differ from the primary inlet ports only in that they are narrower to ensure an optimum air/fuel mix within the secondary combustion chamber. Those unburnt materials which penetrate the suppression layer and travel into the secondary chamber are thus intensely mixed with the secondary combustion air and are incinerated.

The step 8 defining the bottom of the tertiary combustion chamber 14 creates a second suppression area at the top of secondary combustion chamber 12. This suppression area once again increases the airflow velocity around the combustion chamber, thereby increasing the retention period of materials within the secondary combustion chamber and reducing fly ash emissions. In addition, this acceleration increases further the turbulence within the secondary combustion chamber to increase further the combustion efficiency. The radial flow of materials around the suppression area of the secondary combustion chamber also centrifugally forces fly ash to the outside of the chamber where it is removed to a separation tank 44 via a conduit 42. The conduit 42 extends tangentially through the side wall of the refractory liner and is directed parallel to the direction of airflow within the secondary combustion chamber in order to facilitate flow of fly ash into the conduit. Fly ash entering the separation tank 44 settles to the bottom of the tank where it is removed via a valve 46, which is designed to allow the ash to flow out of the tank while minimizing heat losses. The opening degree of the valve will depend on the volume and density of ash removed from the unit.

Combustion products exiting the top of secondary combustion chamber 12 enter tertiary combustion chamber 14, where they are mixed with combustion air entering the chamber tangentially from tertiary inlet chamber 20 and tertiary inlet ports 47. Top and bottom ends of the chambers are defined by a wall 48 and by the wall 26 defining the top wall of the preheating chamber 18. Although the structure and operation of the tertiary inlet ports is essentially identical to that of the primary and secondary inlet ports, the pressure of the air is separately controlled via the shutter 208 located in conduit 206. These tertiary inlet ports not only provide for additional combustion of any remaining waste materials, but also allow the unit to control the temperatures within the chamber by increasing or decreasing the flow rate of relatively cool tertiary combustion air. This tertiary combustion air can thus be used to cool the materials exiting the unit to a desirable level for further manipulations, such as afterburning or releasing the exhausts directly to the atmosphere.

Ashes remaining in the bottom of primary combustion chamber 10 are sterilized and then removed from the unit via apparatus 100. Apparatus 100 includes a powdered ash removal device 102 which is rotatably mounted on the floor of the unit and which conveys the residual ashes from the bottom of sloped wall 38 of the refractory to a centrally located outlet leading to a conveyor 104, which in turn transports the ashes away from the unit. The ash removal device is driven via a variable speed motor 106 and a conventional chain or belt drive mechanism 108. Device 102 is also provided with spiral blades 110 which are constructed from a cast material and which transport the ashes to the central outlet of the unit. The rotary speed of the device 102 is set so that the blades 110 gently break up any remaining clumps of materials and roll the material over without stirring it, thereby exposing any unburnt materials to oxygen for incineration while minimizing the production of fly ash. The retention time of the residual ashes in the removal device is determined by the shape of the blades 110 and by the speed of rotation of the device. In a preferred embodiment, the device is designed to maintain the residual ashes in the device for at least 5 seconds.

In order to ensure sterilization of the residual ashes within the burner, the apparatus 100 includes a plurality of second stage burner nozzles 112 which are positioned beneath the device 102 and which heat the materials in the device to a uniform temperature of at least 1800° F. The burners are fed by a conduit 113 connected to a source of fuel in a conventional manner. These burners also function as a continuous pilot for the primary combustion chamber 10 by igniting materials which are injected into the chamber.

A cooling system is also provided in the apparatus 100 to prevent warping of the cast blades 110 and to keep powdered ashes out of the drive system for the ash removal device. This cooling system includes conduits 114 which extend through a wall of preheating chamber 18 to allow preheated air to flow to the ash removal device 102. Preheated air is preferred for this operation because ambient air would produce an undesirably high temperature differential across the device 102, which temperature differential could damage the device or decrease the efficiency of the sterilization process. The chamber into which the cooling air flows is sealed with a gasket material (not shown) which is capable of withstanding the high temperatures present in this chamber. This gasket material prevents cooling air from entering the primary combustion chamber.

Figure 4:
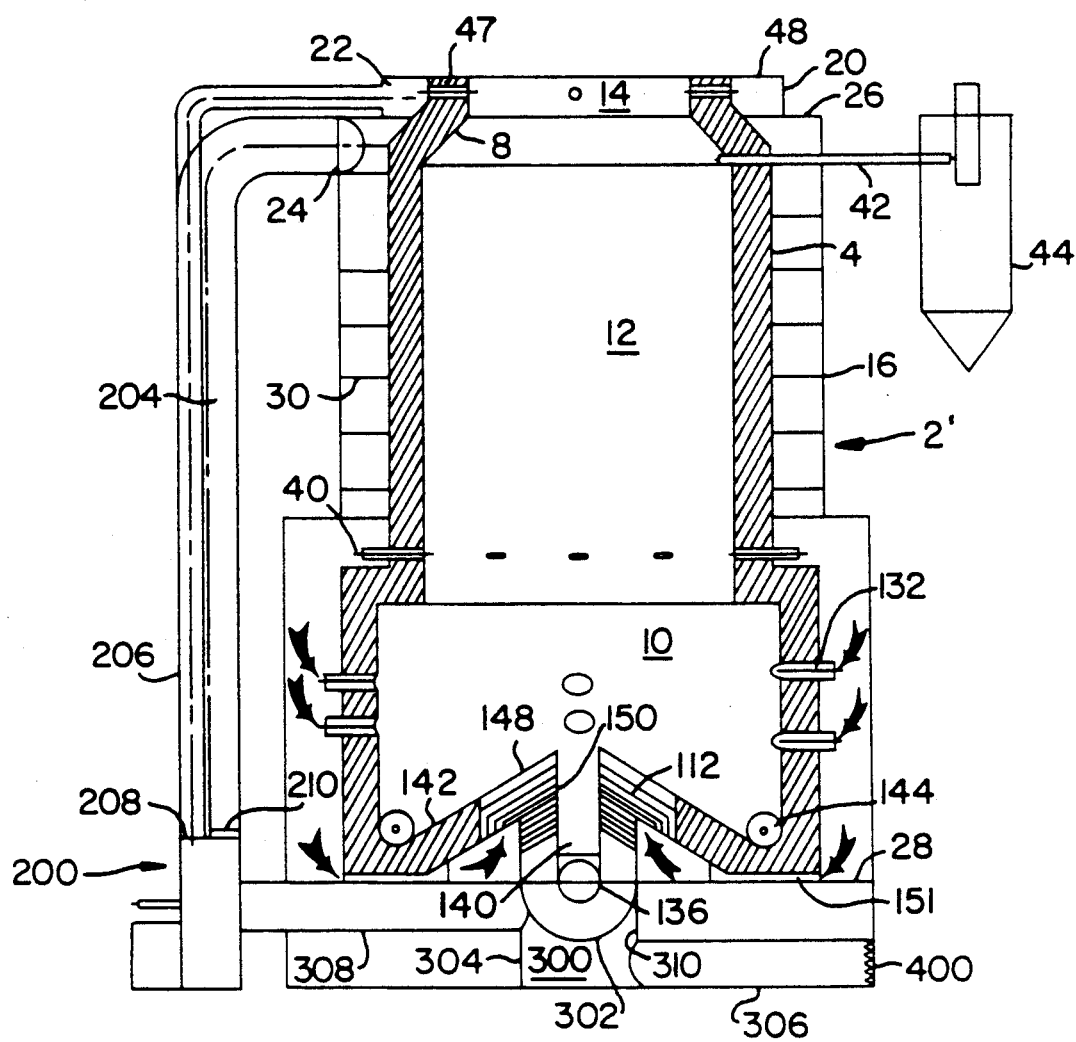
FIG. 4 is a schematic representation, shown partially in cross section, of a side view of a gasification unit constructed in accordance with a second embodiment of the present invention.
Figure 5:
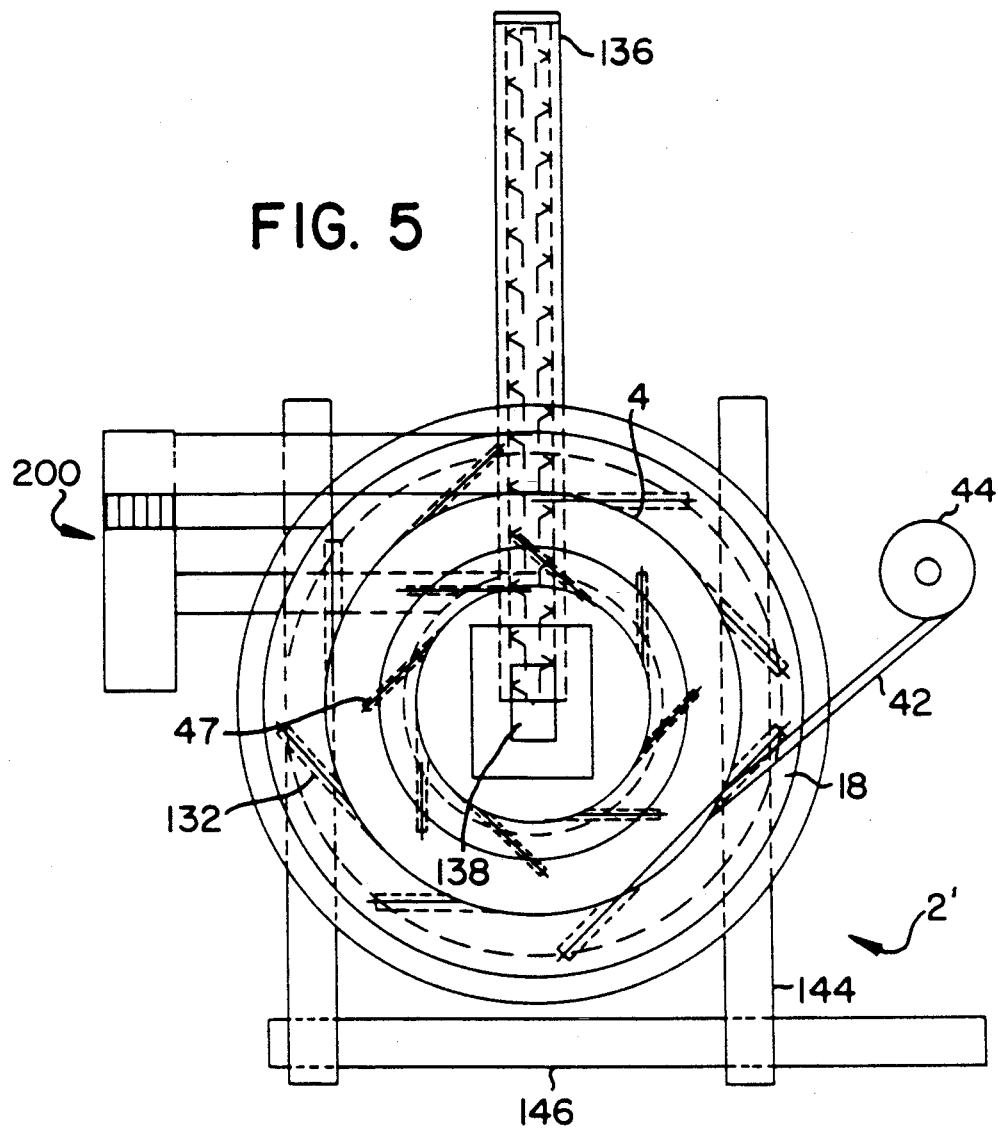
FIG. 5 is a schematic representation of a top view of the gasification unit illustrated in FIG. 4.

With reference to FIGS. 4 and 5, a second embodiment of the invention is illustrated which differs from the first embodiment only in that the waste materials are injected into the primary combustion chamber from the bottom instead of the sides. This embodiment enables the incineration of pelletized materials or other large or heavy materials which cannot be injected through the sides of the refractory at high speeds.

In accordance with this embodiment of the invention, a conveyor 136 conveys waste materials through an opening 138 formed in the bottom of the refractory liner 4 of furnace 2'. Additional materials coming into the opening 138 force materials through opening 138, through a chamber 140, and then into the primary combustion chamber 10, where they are incinerated. Since the chamber 140 is heated by virtue of its proximity to the primary combustion chamber, materials present in chamber 140 are heated to a temperature of at least 212° F. so that moisture present within the materials boils away immediately after the materials exit the chamber, thereby increasing the unit's combustion efficiency.

The top of chamber 140, which top is defined by the ends of sloping sections 142 of the floor of the furnace, should be positioned below the lowermost combustion air inlets 132 in order to ensure sufficient contact between the waste materials and the combustion air and to ensure sufficient air turbulence within the combustion chamber 10. On the other hand, the top of chamber 140 must be high enough to provide a slope on floor 142 which is sufficient to ensure that ashes from the combustion process roll down the floor to the take out screws 144 located adjacent the side wall of the refractory liner. These take out screws convey the ashes out of the furnace and into a conveyor 146. The screws 144 are constructed out of a heat resistant material, and thus do not require provision of the cooling system associated with the ash removal device of the first embodiment.

The inner portion of the floor of the furnace is constructed in the form of a grate 148 provided with a plurality of openings 150 formed therein. These openings cooperate with preheating chamber 18 via pipes 151 and provide additional combustion air for the pelletized materials. These openings are angled inwardly and upwardly as illustrated in FIG. 4 so that air flowing through the openings contacts the sides of the pile of waste materials to increase its angle of repose, i.e., the angle formed by the sides of the material pile. This increased angle increases the contact area between the waste materials and the combustion air, thereby increasing further combustion efficiency.

Since the waste material feed system of this embodiment cannot inject materials into the primary combustion chambers at high velocities, and since the size and weight of the pelletized or bulk materials hinder mixing of the materials with the combustion air, the combustion air should be blown into the combustion chamber at a higher velocity than in the first embodiment to ensure adequate contact between the combustion air and the waste materials.

As in the first embodiment, second stage burner nozzles 112 are provided in the unit to function as a continuous pilot and to sterilize the ashes present on the sloped chamber floor.

By incinerating completely waste materials and by sterilizing residual ashes, the systems described above meet or exceed all applicable regulatory standards relating to the disposal of hospital wastes. Although these gasification units are especially well-suited to incinerate infectious or contaminated waste products typically produced by hospitals, they could be easily modified to incinerate wood wastes, sludge, or any other high-moisture materials without departing from the spirit and scope of the invention.

What is claimed is:

1. A gasification unit comprising:
   (A) a refractory liner surrounding a primary combustion chamber;
   (B) means for drawing combustion air past a portion of said refractory liner in contact with an outer surface thereof such that said combustion air is preheated and said refractory liner is cooled;
   (C) means for injecting said combustion air into said primary combustion chamber via primary air inlets formed in said refractory liner;
   (D) means for injecting waste materials into said primary combustion chamber via a material inlet formed in said refractory liner; and
   (E) means for sterilizing and then removing residual ashes from said gasification unit.

2. The gasification unit of claim 1, wherein said means (B) comprises a fan having an inlet cooperating with said portion of said refractory liner and an outlet cooperating with said means (C).

3. The gasification unit of claim 2, wherein said portion of said refractory liner comprises a lower portion of said refractory liner which is enclosed in a cooling chamber having an inlet and having an outlet connected to said inlet of said fan, and further comprising baffles which are located within said cooling chamber and which are adapted to force incoming combustion air to circulate around said refractory liner before exiting said cooling chamber via said outlet.

4. The gasification unit of claim 3, further comprising a shutter device connecting said inlet of said cooling chamber to the ambient atmosphere.

5. The gasification unit of claim 2, further comprising a wall surrounding at least an upper portion of said refractory liner with a space formed therebetween to define an enclosed preheating chamber, wherein said outlet of said fan is connected to said preheating chamber via a first conduit at a location above said primary air inlets, and wherein said primary air inlets extend tangentially through a side wall of said refractory liner and into said primary combustion chamber.

6. The gasification unit of claim 5, wherein said material inlet extends through a floor of said refractory liner and into said primary combustion chamber.

7. The gasification unit of claim 6, wherein said floor of said refractory liner is sloped from said material inlet towards said side wall of said refractory liner, and further comprising a screw which is located on said floor of said refractory liner adjacent said side wall and which is adapted to convey residual ashes out of said gasification unit.

8. The gasification unit of claim 5, wherein said material inlet extends tangentially through said side wall of said refractory liner and into said primary combustion chamber, and further comprising means for conveying air from said preheating chamber and into said material inlet.

9. The gasification unit of claim 5, wherein said refractory liner is stepped at a first location to define a secondary combustion chamber which is located above said primary combustion chamber and which has a diameter which is smaller than that of said primary combustion chamber, and wherein secondary air inlets extend tangentially through said side wall of said refractory liner and into said secondary combustion chamber.

10. The gasification unit of claim 9, wherein said refractory liner is stepped at a second location to define a tertiary combustion chamber which is located above said secondary combustion chamber and which has a diameter which is smaller than that of said secondary combustion chamber, and wherein tertiary air inlets extend tangentially through said side wall of said refractory liner and into said tertiary combustion chamber from a tertiary air inlet chamber which is connected to said outlet of said fan via a second conduit.

11. The gasification unit of claim 9, further comprising a fly ash removal device connected to an outlet of said secondary combustion chamber.

12. The gasification unit of claim 9, wherein said material inlet is located above at least one of said primary air inlets and wherein said means (D) is adapted to inject said waste materials into said primary combustion chamber at a speed which increases turbulence within said primary chamber.

13. The gasification unit of claim 1, wherein said means (E) comprises
a floor of said primary combustion chamber which slopes downwardly,
an ash removal device comprising a plurality of spiral blades which are adapted to transport residual ashes from said sloped floor to a central portion of said primary combustion chamber at a predetermined speed,
a second stage burner which is located beneath said ash removal device and which is adapted to heat further said residual ashes, thereby to ensure complete combustion of said waste materials and sterilization of said residual ashes, and
means for conveying said residual ashes out of said gasification unit.

14. The gasification unit of claim 13, further comprising means for supplying air to said ash removal device to prevent said blades from warping.

15. The gasification unit of claim 14, wherein said means for supplying air comprises a conduit connecting said preheating chamber to a chamber positioned beneath said ash removal device.

16. A method of gassifying waste materials, comprising the steps of:
(A) providing a gasification unit including a refractory liner which surrounds a primary combustion chamber;
(B) drawing combustion air past a portion of said refractory liner in contact with an outer surface thereof thereby to preheat said combustion air while simultaneously cooling said refractory liner; then
(C) injecting said combustion air into said primary combustion chamber;
(D) injecting waste materials into said primary combustion chamber;
(E) discharging exhaust gases from said gasification unit; and
(F) sterilizing and then removing residual ashes from said gasification unit.

17. The method of claim 16, wherein said step (A) comprises the step of enclosing said portion of said refractory liner in a cooling chamber having an inlet and an outlet, and wherein said step (B) comprises the steps of
drawing said combustion air into said inlet of said cooling chamber, then
forcing said combustion air to circulate around said refractory liner, and then
drawing said combustion air out of said outlet of said cooling chamber.

18. The method of claim 17, further comprising the step of adjusting a rate at which said combustion air is drawn into said inlet of said cooling chamber.

19. The method of claim 18, wherein said step of adjusting said rate comprises the step of adjusting an opening degree of a shutter device which connects said inlet of said cooling chamber to the atmosphere.

20. The method of claim 16, wherein said step (C) comprises the steps of
injecting said combustion air into an enclosed preheating chamber at a location above primary air inlets which connect said preheating chamber to said primary combustion chamber and which extend tangentially through a side wall of said refractory liner wall and into said primary combustion chamber, said enclosed preheating chamber being defined by a space formed between said refractory liner and a shell surrounding at least an upper portion of said refractory liner, then
equalizing a pressure of said combustion air within said preheating chamber, and then
injecting said combustion air through said primary air inlets, thereby to increase turbulence within said primary combustion chamber.

21. The method of claim 20, wherein said step (C) further comprises the step of providing a refractory liner which is stepped at a first location to define a secondary combustion chamber which is located above said primary combustion chamber and which has a diameter which is smaller than that of said primary combustion chamber, and further comprising the step of injecting said combustion air through secondary air inlets which extend tangentially through said side wall of said refractory liner and into said secondary combustion chamber, thereby to increase turbulence in said secondary combustion chamber.

22. The method of claim 21, wherein said step (C) further comprises the step of providing a refractory liner which is stepped at a second location to define a tertiary combustion chamber which is located above said secondary combustion chamber and which has a diameter which is smaller than that of said secondary combustion chamber, and further comprising the step of injecting said combustion air into a tertiary air inlet chamber located above said preheating chamber and then through tertiary air inlets which extend tangentially through said side wall of said refractory liner and into said tertiary combustion chamber, thereby to increase turbulence in said tertiary combustion chamber.

23. The method of claim 20, wherein said step (D) comprises the step of injecting said waste materials through a bottom wall of said refractory liner and into said primary combustion chamber.

24. The method of claim 20, wherein said step (D) comprises the step of injecting said waste materials tangentially through said side wall of said refractory liner and into said primary combustion chamber at a location above at least some of said primary air inlets, thereby further increasing turbulence within said primary combustion chamber.

25. The method of claim 24, further comprising the step of mixing combustion air with said waste materials before said step (D), thereby heating said waste materials.

26. The method of claim 16, further comprising the steps of removing fly ash from said gasification unit before said step (E), then storing said fly ash in a separation tank, and then removing said fly ash from said separation tank at a controlled rate.

27. The method of claim 16, wherein said step (F) comprises the steps of providing a floor of said primary combustion chamber which slopes downwardly, conveying residual ashes from said sloped floor to a central portion of said primary combustion chamber at a predetermined rate while simultaneously heating said residual ashes so that said residual ashes remain in said gasification unit for at least a predetermined time at a temperature which is above a predetermined temperature, thereby to ensure combustion of all of said waste materials and sterilization of said residual ashes, and then conveying said residual ashes out of said gasification unit.

28. The method of claim 27, wherein said predetermined temperature is at least 1800° F. and said predetermined time is 5 seconds.

29. The method of claim 28, further comprising the step of supplying air from said preheating chamber to a conveying device located within said primary combustion chamber to prevent blades of said conveying device from warping.

30. The method of claim 27, further comprising the step of selecting an angle of said sloped floor to ensure that said waste materials remain in said primary combustion chamber for a predetermined amount of time, thereby to promote complete combustion of said material.

* * * * *